United States Patent
Kuttner

[11] 3,755,729
[45] Aug. 28, 1973

[54] CIRCUIT FOR THE CHARGING OF BATTERIES

[75] Inventor: Werner Kuttner, Erlangen, Germany

[73] Assignee: Siemens Aktiengesellschaft, Munich, Germany

[22] Filed: Sept. 25, 1972

[21] Appl. No.: 291,932

[52] U.S. Cl.......................... 320/20, 320/32, 320/40
[51] Int. Cl. ............................................... H02j 7/10
[58] Field of Search .................... 320/20–22, 31, 32, 320/39, 40; 323/4

[56] References Cited
UNITED STATES PATENTS
3,387,199  6/1968  Billerbeck, Jr. et al. ............. 320/32
3,688,177  8/1972  Reeves et al....................... 320/39 X Primary Examiner—J. D. Miller
Assistant Examiner—Robert J. Hickey
Attorney—Hugh A. Chapin et al.

[57] ABSTRACT

This invention is concerned with a circuit for charging batteries, particularly aircraft batteries, having a rectifier connected on the input side of the battery to a single- or three-phase system. The circuit uses a controlled semiconductor element or switch connected into the charging circuit of the battery and in which the control electrode of the semiconductor is connected to the output of a current control device having an on-off characteristic. A first input of the current control device is set at a predetermined threshold value of the charging current while the actual value of the charging current is connected as a second input to the device. As a result, the current control device transmits a switching signal to the control electrode of the semiconductor switch only when the actual value of the charging current is smaller than the predetermined threshold value. Thus an average charging current is self-regulated within the charging circuit.

Connected to the first input of the current control device is the output of the voltage control device also having an on-off characteristic. The first input of the voltage control device is set at a predetermined threshold voltage, adjusted to the gassing voltage of the battery, and connected to the second input of the voltage control device is the actual battery voltage. Thus, the voltage control device delivers to the current control device the desired predetermined set value for the charging current only if the actual value of the battery voltage is lower than the predetermined set value of the battery voltage.

15 Claims, 5 Drawing Figures

3,755,729

CIRCUIT FOR THE CHARGING OF BATTERIES

BACKGROUND OF THE INVENTION

1. Field of the Invention

This invention is concerned with a circuit for charging batteries, particularly aircraft batteries, having a rectifier connected on the input side of single- or three-phase system.

2. Description of the Prior Art

For charging or recharging batteries, particularly aircraft batteries, it is common and well known to take the required d-c charging current from the single- or three-phase system by means of a rectifier having uncontrolled elements in a bridge circuit. For the rapid charging of batteries, for example, nickel-cadmium or lead storage batteries, the charging current and the charging time must be matched to the capacity of the battery. If the charging current is too high and/or the charging time too long, overcharging can occur, reducing the usefulness of the battery considerably. Charging equipment for the rapid charging of batteries is furthermore required to cover a range of charging currents continuously adjustable within wide limits. Similarly, the equipment must be adjustable in the same manner to cover the gassing range of the battery. Furthermore, the temperature conditions during the charging time must be observed, because the dependence of the gassing voltage on the temperature must be taken into account. The battery, thus, must be prevented from overcharging at very high temperatures, say, 70° C and from undercharging at relatively low temperatures, for example, minus 40° C.

SUMMARY OF THE INVENTION

The invention is based on the recognition, confirmed by experiments, that it is advisable at such extreme temperature conditions to use intermittent charging and recharging of the battery, and to cycle the d-c charging current within a narrower or wider range.

It is thus an object of the invention to provide a circuit arrangement which meets the above-mentioned reguirements. Thus, on the one hand, overcharging is to be prevented, while, on the other hand, the battery is to be kept ready for operation and the self discharging of the battery compensated. In addition, the temperature dependence of the gassing voltage must be taken into account.

The invention comprises the connection, in the charging circuit of the battery, of a controlled semiconductor element, the control electrode of which is tied to the output of a controlled current source which has an on-off characteristic. The first input of the controlled current source is set at a predetermined threshold value for the charging current and the second input set at the actual value of the charging current. Thus, the controlled current source transmits a switching signal to the control electrode of the semiconductor element only if the actual value is smaller than the predetermined value, so that a mean or average charging current is formed in the charging circuit. The first input of the controlled current source is connected with the output of a voltage control having an on-off characteristic. The first input of the voltage control is set at a predetermined threshold value of voltage adjusted to the gassing voltage of the battery. The second input of the voltage control is set at the actual value of the battery voltage, so that the voltage control delivers the desired predetermined control value for the charging current to the controlled current source only when the actual value of the battery voltage is lower than the predetermined set value of the battery voltage.

The controlled semiconductor element is therefore driven by a voltage control superimposed on the controlled current, resulting in the driving of the semiconductor by the controlled current at a high cycling rate up to the gassing voltage of the battery, and from this point onward by the voltage control at a low cycling rate.

BRIEF DESCRIPTION OF THE DRAWINGS

The invention will be better understood from the following detailed description of an exemplary embodiment, taken in conjunction with the accompanying drawings in which.

DESCRIPTION OF THE PREFERRED EMBODIMENT

Figure 1:
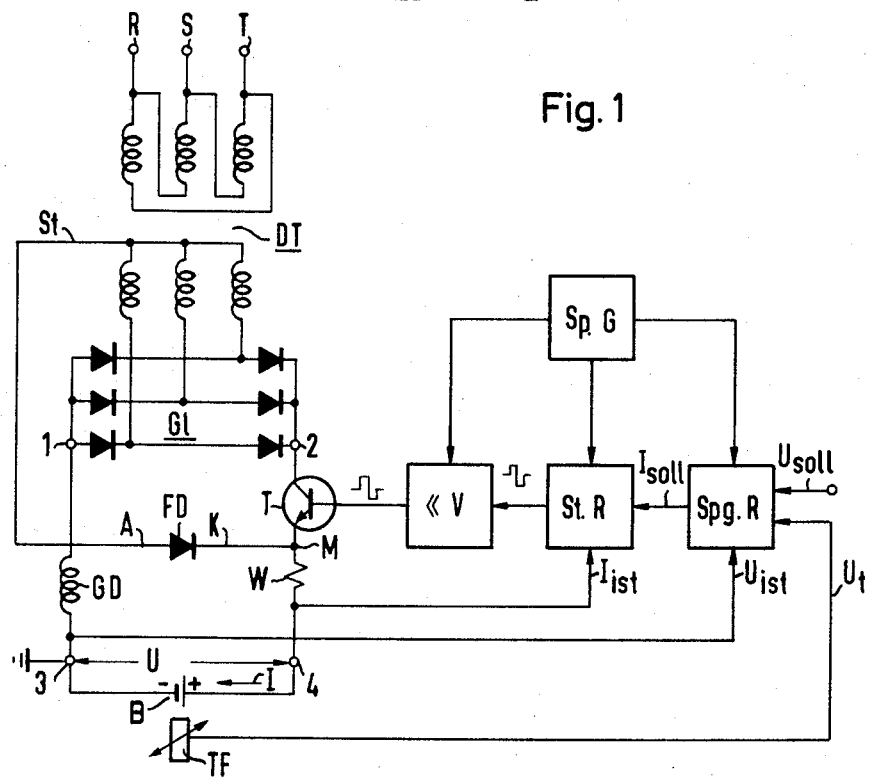
FIG. 1 illustrates a circuit for charging a battery in accordance with the invention.

In FIG. 1, a circuit arrangement is illustrated for charging a battery B which, for example, may be an aircraft battery. The circuit arrangement comprises a three-phase transformer, DT, which is connected to a three-phase system having phases R, S, T and a rectifier having uncontrolled elements in a three-phase bridge circuit. The negative output terminal of the rectifier G1 is designated 1, while the positive output terminal of the rectifier G1 is designated 2. It is the usual practice to connect the negative output terminal 1 directly to the negative terminal 3 of the battery, and the positive output terminal 2 directly with the positive terminal 4 of the battery B.

To carry out the invention, a controlled semiconductor element T and a resistor W are connected in series in the positive charging-circuit between the output terminal 2 and the positive terminal 4 of battery B. The controlled semiconductor element may be a thyristor, a switching transistor, or a group or combination of such semiconductor components. In the present case, a switching transistor T is used, and specifically, an NPN switching transistor. The collector of the switching transistor T is connected with the positive output terminal 2, and its emitter is connected with the positive terminal 4 of the battery B by resistor W.

The resistance of resistor W is very low. For example, it may be only 4 milliohms. In some cases, resistor W can therefore be replaced by the line resistance. The voltage drop across the resistor W, which is in the order of 50 mV, is used to determine the actual value $I_{ist}$ of the charging current I in the charging circuit. Point M, at the emitter of switching transistor T, is provided as the common reference point.

A smoothing choke, GD, is inserted into the negative line of the charging circuit between the negative output terminal 1 and the negative terminal 3 of battery B. Terminal 3 of the battery can be grounded or connected to a point on the aircraft body. A bypass diode FD is provided as protection for switching transistor T. If an NPN switching transistor is used as the switching transistor T, it is connected on the anode side with the neutral point St of the secondary windings of the three-phase transformer, DT, on the cathode side with the emitter of the switching transistor T and therefore with common reference point M.

The base of the switching transistor T, which serves as the control electrode, is connected with the output of an amplifier V. The input of the amplifier V is directly connected with the output of a current control device S$t$R. A predetermined threshold current value $I_{soll}$ is set at the first input of the current control device StR from the output of a voltage control device SpgR. The current control StR furthermore has a second input for feeding in the actual charging current, $I_{ist}$. The voltage control SpgR has a first input for a predetermined voltage value $U_{soll}$, which can be set to a fixed predetermined value obtained, for example, as a pick off from a potentiometer (not shown). A second input is used for feeding in the actual battery voltage, $U_{ist}$. The actual charging current, $I_{ist}$, for the current control device S$t$R is a function of the actual charging current. It is preferably obtained from the resistor W as a proportional voltage and is symbolized by the connection between the battery end of resistor W and the second input to the current control StR. The actual voltage value $U_{ist}$ for the voltage control SpgR is the charging voltage of the battery B. It is taken off at the grounded end of the smoothing choke GD and the common reference point M. This is symbolized by the connection between the negative pole terminal 3 of the battery B and the second input to the voltage control device SpgR.

Figure 5:
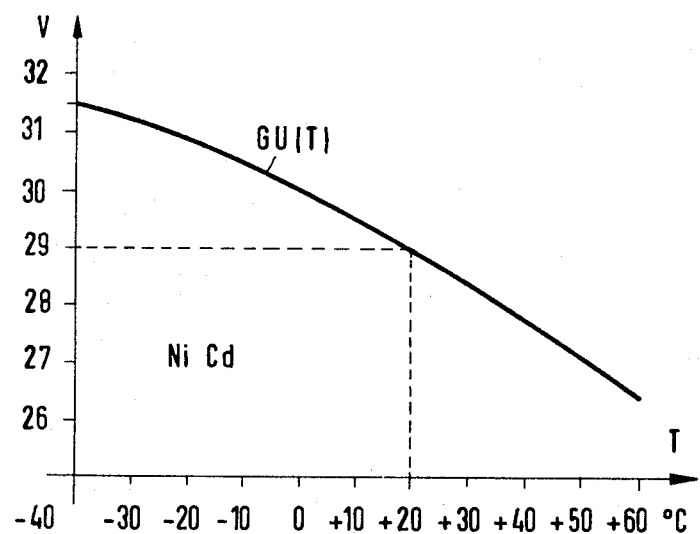
FIG. 5 illustrates the curve of the gassing voltage as a function of the temperature for a nickel-cadmium battery.

In order to take into account the temperature dependence of the gassing voltage GU of the battery B (See FIG. 5), an additional control voltage value $U_t$ is fed to the voltage control SpgR as a third input. This voltage $U_t$ is furnished by a temperature sensor TF, which may for example be a thermistor, attached at battery B. The temperature sensor TB may be arranged outside the battery housing between two pole terminals. A thermistor is particularly suitable as temperature sensor TF in the charging of a nickel-cadmium battery B, as its characteristic approximately corresponds to the temperature dependence of the gassing voltage GU on the temperature T of the battery liquid in a nickel-cadmium battery B. This temperature dependence is shown in FIG. 5. At room temperature of T = 20° C, for example, the gassing voltage is GU = 29 V. The additional predetermined control voltage value $U_t$ changes the predetermined fixed control voltage value $U_{soll}$ in the voltage control SpgR in such a manner that the voltage control SpgR always operates at a control value corresponding to the gassing voltage GU at the prevailing battery temperature T. The predetermined control voltage value is therefore controlled as a function of the temperature T of the battery B or the battery liquid.

The amplifier V, the current control S$t$R and the voltage control SpgR are centrally supplied from a power supply unit SpG, which is shown in FIG. 1.

The switching transistor T cycled by the amplifier V switches the charging current I of the battery B on and off. If the switching transistor T is cut off, the charging current I decays because of the inductive energy stored in the smoothing choke GD by the left portion of the rectifier bridge G1, the secondary windings of the three-phase transformer DT and the bypass diode FD. The decay is a function of the time constant in this portion of the circuit. The cycling of the switching transistor T is determined by the current control S$t$R and by the voltage control SpgR.

The current control S$t$R as well as the voltage control SpgR in FIG. 1 are designed as on-off controls, and in particular as on-off amplifiers. Only two switching states therefore occur at any one time at their outputs. There therefore occurs either an output signal which corresponds to the logic level zero, or an output signal which corresponds to the logic level L. The current control S$t$R delivers an output signal corresponding to L, only when the actual current value $I_{ist}$ fed to it is smaller than the predetermined threshold current $I_{soll}$. By this output signal corresponding to L, the switching transistor T is turned on by amplifier V, i.e., it is placed in its conducting state. The voltage control SpgR delivers an output signal $I_{soll}$ (corresponding to a logic level L) only when the actual voltage value V of the battery is smaller than the set voltage $U_{soll}$, corrected by the additional voltage $U_t$.

The two output switching states of the voltage control SpgR and the current control StR therefore lead to either turning the switching transistor T on or off. In this connection it should be noted that at the inputs of the controls S$t$R and SpgR comparisons between the threshold and the actual values are made for the charging current and the charging voltage, and this governs the switching state at the output of the respective control S$t$R or SpgR. The current control is therefore subject to the voltage control. In other words, during the charging period, until the gassing voltage GU of the battery B is reached only the current control S$t$R is engaged. Afterwards the voltage control SpgR is additionally activated during the trickle charging. This will be explained more fully in the following with the aid of FIGS 2 to 4. In this connection a nickel-cadmium battery is considered as the battery B at a temperature of T = 20° C and with a gassing voltage GU = 29 V.

Figure 2:
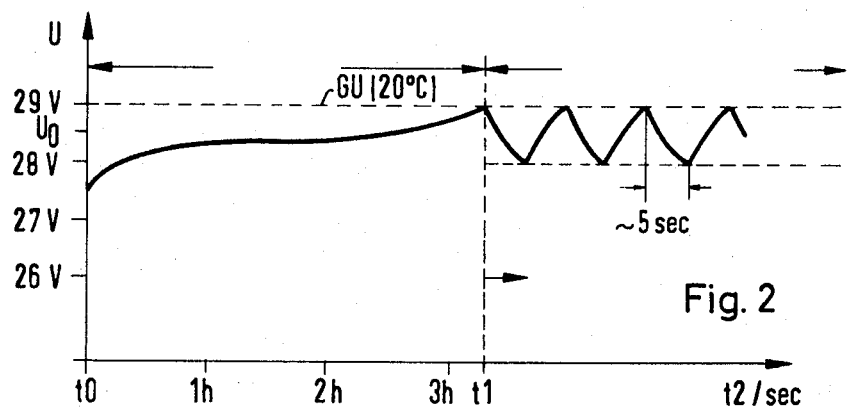
FIG. 2 illustrates the curve of the battery voltage plotted against time during the charging and cycling charging process.
Figure 3:
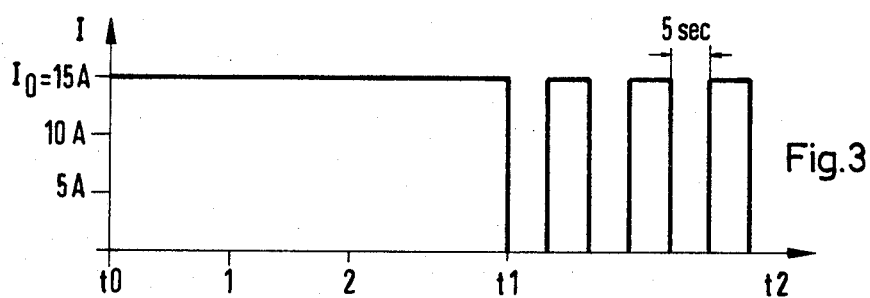
FIG. 3 illustrates the corresponding curve for the mean charging current plotted against time.

According to FIGS. 2 and 3, the battery B is charged in pulse fashion at a constant average value by a charging current $I_o$, until the gassing voltage GU of the battery B is reached.

The part to the left of the charging-voltage diagram of FIG. 2 illustrates the rise in the time of the battery voltage U within the charging period from the time $t_o$ to the time $t_1$. It is here assumed, as previously mentioned, that the gassing voltage is 29 V. The changing of the battery B between the points in time $t_o$ and $t_1$ is called "full charging." As soon as the gassing voltage GU is reached, the actual voltage $U_{ist}$ is equal to the temperature-corrected voltage, and the output signal of the voltage control SpgR assumes its other switching state, which corresponds to the level zero. As the current value has thus changed the current control S$t$R also transmits an output signal, which corresponds to the level zero. The switching transistor T is therefore cut off from passing a charging current I.

In the right-hand part of FIG. 2, is shown the plot of trickle charging against time, which follows after the full charging. Initially the turned-off state of the switching transistor T continues, until the battery voltage U has dropped to a definite, settable value, for instance, 28 V. This lower voltage level can be adjusted by the positive feedback of the voltage control S$pg$R. If this lower voltage limit is reached, for example, after 5 seconds, the output signal of the voltage control S$pg$R again assumes its other switching state, corresponding to the level L, i.e., the current control S$t$R is again given a current input I$_{soll}$ different from zero. The switching transistor T is turned on, so that the battery voltage U again rises to the gassing voltage GU. This process is repeated periodically and is called "charge maintenance" (trickle charge).

Figure 4:
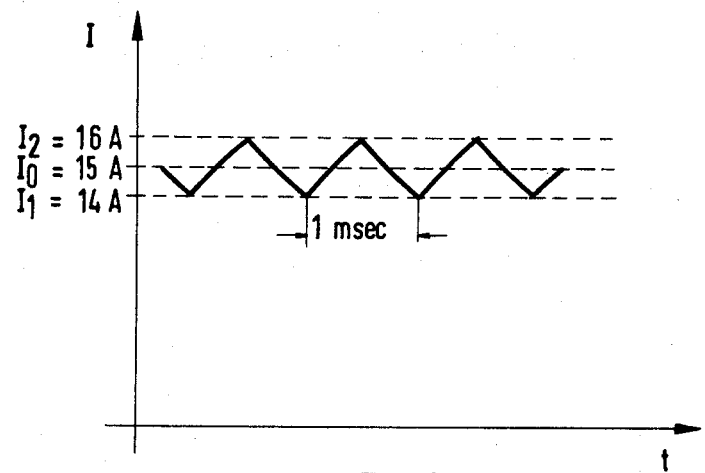
FIG. 4 illustrates the cycling of the charging current.

The trickle charging therefore takes place periodically as a function of the battery voltage U with a low cycling frequency, for instance, 0.1 Hz. In this process the battery voltage U as shown in FIG. 2 oscillates periodically from the time $t_1$ about a mean voltage value $U_o$. The current pulsing used for full charging and explained more fully in the following with reference to FIG. 4, is here maintained with a pulse frequency, for example, 1 kHz.

FIG. 3 illustrates the corresponding curve of the charging current plotted against time from the time $t_o$ to the time $t_1$ during full charging, and next to it, to the right, the current pulsing during "charge maintenance" up to time $t_2$. The mean charging current $I_o$ during full charging between the times $t_o$ and $t_1$ and during the subsequent current pulses (current-time areas) for the charge maintenance has a mean $I_o$ = 15 A.

It has already been mentioned above that the charging of the battery B takes place in pulse fashion. Contrary to the presentation in FIG. 3, there is therefore not a constant charging current $I_o$, but short, pulse-like current cycles. The actual pulse-like curve of the charging current I is shown in FIG. 4. It is seen that the pulsating charging current I assumes values between $I_1$ = 14 A and $I_2$ = 16 A during the full charging time (between times $t_o$ and $t_1$) as well as during the charge-maintenance (between the points in time $t_1$ and $t_2$) in the region of the current-time areas (FIG. 3). The mean charging current $I_o$ therefore has the previously given value, $I_o$ = 15 A. The width of the band between the values $I_1$ and $I_2$ can be adjusted by the positive-feedback resistor of the current control S$t$R. The current control S$t$R furnishes an output signal corresponding to L, when the current setpoint value I$_{soll}$, which is given by the voltage control S$pg$R, corresponds to the level L, i.e., in the present case, to $I_o$ = 15 A. The pulse period is, for example, 1 millisecond, i.e., the pulse frequency is then 1 kHz. This value depends on the output voltage of the rectifier G1, the battery voltage U and the inductance of the smoothing choke GD.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A circuit for regulating the charging of a battery in which the charging circuit is comprised of a rectifier connected between the input of the battery and a power supply, the regulating circuit comprising the combination of:

a switching means, connected to the charging circuit of the battery, a current control device connected to and controlling the switching means, said control device having a first control input whose input signal is a function of a set predetermined threshold value of charging current, and a second control input having as an input a signal which is a function of the actual value of the charging current, the current control device permitting the switching means to permit charging of the battery when the actual value of the charging current is less than the set predetermined threshold value, a voltage control device, whose output is connected to the first input of the current control device, the voltage control device having a first input whose input signal is a function of a predetermined threshold voltage value which is a function of the gassing voltage of the battery, a second input to the voltage control device, having as its input a signal which is a function of the actual battery voltage, the voltage control device delivering an output signal to the first input of the current control device only when the actual value of the battery voltage is less than the predetermined threshold voltage, whereby said battery is charged when its voltage is less than the predetermined gassing voltage of the battery.

2. A circuit for regulating the charging of a battery as in claim 1 wherein the switching means comprises a controlled semiconductor element, whose control electrode is connected to the output of the controlled current source.

3. A circuit for regulating the charging of a battery as in claim 2 wherein the controlled semiconductor is a switching transistor.

4. A circuit for regulating the charging of a battery as in claim 2 wherein the controlled semiconductor is a thyristor.

5. A circuit for regulating the charging of a battery as in claim 1 in which the actual charging current applied to the current control device is determined as a function of a voltage drop across a resistor connected within the charging circuit.

6. A circuit for regulating the charging of a battery as in claim 1 wherein the actual voltage of the battery applied to the second input of the voltage control device is determined as a function of the voltage at the terminals of the battery.

7. A circuit for regulating the charging of a battery as in claim 1 wherein the value of the gassing voltage is determined as a function of the temperature of the battery.

8. A circuit for regulating the charging of a battery as in claim 1 wherein the value of the gassing voltage is determined as a function of the temperature of the battery liquid.

9. A circuit for regulating the charging of a battery as in claim 7 wherein the voltage control device has an input derived as a function of the temperature of the battery to compensate for the temperature dependence of the gassing voltage of the battery.

10. A circuit for regulating the charging of a battery as in claim 9 wherein the battery temperature is determined by a temperature sensor attached to the battery.

11. A circuit for regulating the charging of a battery as in claim 10 wherein the temperature sensor is a thermistor.

12. A circuit for regulating the charging of a battery as in claim 1 wherein the rectifier is an unregulated rectifier in a bridge circuit connected by a transformer to a system.

13. A circuit for regulating the charging of a battery as in claim 12 wherein the switching means is comprised of a controlled semiconductor switching element having a bypass diode connected to the neutral point of the transformer secondary and to a point between the semiconductor and a pole of the battery.

14. A circuit for regulating the charging of a battery as in claim 13 wherein the anode of the bypass diode is connected to the neutral point of the transformer secondary and the cathode is connected to the point between the resistor and the semiconductor.

15. A circuit for regulating the charging of a battery as in claim 12 wherein a smoothing choke is connected within the charging circuit to compensate for sudden current variations within the charging circuit.

* * * * *